United States Patent
Herrmann et al.

(10) Patent No.: US 6,607,565 B1
(45) Date of Patent: *Aug. 19, 2003

(54) COLORANT PREPARATIONS

(75) Inventors: Manfred Herrmann, Ludwigshafen (DE); Bernd Siegel, Otterstadt (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,097

(22) PCT Filed: Nov. 6, 1998

(86) PCT No.: PCT/EP98/07098

§ 371 (c)(1),
(2), (4) Date: May 25, 2000

(87) PCT Pub. No.: WO99/28397

PCT Pub. Date: Jun. 10, 1999

(65) Prior Publication Data (65)

(30) Foreign Application Priority Data

Nov. 26, 1997 (DE) .......................................... 197 52 333

(51) Int. Cl.⁷ .............................. D06P 1/20; D06P 1/56; D06P 1/613; D06P 5/30
(52) U.S. Cl. ....................... 8/557; 8/560; 8/576; 8/611; 8/613; 8/663; 8/675
(58) Field of Search ............................ 8/557, 560, 576, 8/611, 613, 663, 675

(56) References Cited

U.S. PATENT DOCUMENTS

| | | | |
|---|---|---|---|
| 2,979,528 A | | 4/1961 | Lundsted |
| 4,218,218 A | | 8/1980 | Daubach et al. |
| 4,420,310 A | * | 12/1983 | Opitz et al. |
| 4,427,413 A | | 1/1984 | Baeuerle |
| 5,186,846 A | | 2/1993 | Brueckmann et al. |
| 5,711,791 A | * | 1/1998 | Croker et al. |
| 5,713,993 A | * | 2/1998 | Grezzo Page et al. |
| 6,117,224 A | * | 9/2000 | Siegel et al. |

FOREIGN PATENT DOCUMENTS

| | | |
|---|---|---|
| DE | 29 47 005 | 6/1981 |
| EP | 0 083 553 | 9/1985 |
| EP | 0 655 527 | 5/1995 |
| WO | WO 97/02759 | 1/1997 |
| WO | Wo 97/46623 * | 12/1997 |

OTHER PUBLICATIONS

J.M. Straley, The Chemistry of Synthetic Dyes, vol. 3, pp. 391–413, "Disperse Dyes", 1970.
Wolfgang Gerhartz, et al., Ullmann's Encyclopedia of Industrial Chemistry, vol. A1, pp. 107–112, "Acetylene", 1985.
Brent Smith, et al, Textile Chemist and Colorist, vol. 19, No. 8, pp. 23–29, "Ink Jet Printing for Textiles", Aug. 1987.
L.A. Graham, Textile Chemist and Colorist, vol. 21, No. 6, pp. 27–32, "Ink Jet Systems for Dyeing and Printing of Textiles", Jun. 1989.

* cited by examiner

Primary Examiner—Margaret Einsmann
(74) Attorney, Agent, or Firm—Oblon, Spivak, McClelland, Maier & Neustadt, P.C.

(57) ABSTRACT

Dye preparations comprising, based on the weight of the preparation, from 0.1 to 30% by weight of one or more dyes selected from the class of the anthraquinones or quinophthalones which are free of ionic groups, from 0.1 to 20% by weight of a dispersant based on an arylsulfonic acid-formaldehyde condensation product, from 10 to 90% by weight of a mono- or polyhydric alcohol and optionally water, are useful as inks in the inkjet process and also for sublimation transfer printing.

8 Claims, No Drawings

COLORANT PREPARATIONS

BACKGROUND OF THE INVENTION

1. Field of the Invention

The present invention relates to novel dye preparations comprising, based on the weight of the preparation, from 0.1 to 30% by weight of one or more dyes selected from the class of the anthraquinones or quinophthalones which are free of ionic groups, from 0.1 to 20% by weight of a dispersant based on an arylsulfonic acid-formaldehyde condensation product or from 0.1 to 20% by weight of a water-soluble dispersant based on alkoxylated phenols, from 10 to 90% by weight of a mono- or polyhydric alcohol or mixtures thereof and optionally water, and to their use as inks in the inkjet process and for sublimation transfer printing.

2. Description of the Background

EP-A-655 527 discloses dye preparations comprising disperse dyes and specific dispersants. Prior patent application PCT/EP 97/02759 describes similar dye preparations.

SUMMARY OF THE INVENTION

It is an object of the present invention to provide novel dye preparations comprising anthraquinone or quinophthalone dyes which are free of ionic groups. The novel dye preparations shall be advantageously useful for application in the inkjet process, particularly in the piezo or bubble jet process, for preparing prints on textile substrates and also in sublimation transfer printing.

We have found that this object is achieved by the dye preparations defined at the beginning.

DETAILED DESCRIPTION OF THE PREFERRED EMBODIMENTS

Suitable anthraquinone dyes, which are free of ionic groups, conform for example to the formula I (I)

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, $L^2$ and $L^3$ are independently of each other hydrogen, unsubstituted or phenyl- or $C_1$–$C_4$-alkylphenyl-substituted $C_1$–$C_{10}$-alkoxy, unsubstituted or phenyl-substituted $C_1$–$C_{10}$-alkylthio, halogen, hydroxyphenyl, $C_1$–$C_4$-alkoxyphenyl, $C_1$–$C_6$-alkanoyl, $C_1$–$C_6$-alkoxycarbonyl or a radical of the formula where $G^1$ is oxygen or sulfur and $G^2$ is hydrogen or mono-$C_1$–$C_8$-alkylsulfamoyl whose alkyl chain is with or without interruption by 1 or 2 oxygen atoms in ether function, and $L^4$ is unsubstituted or phenyl- or $C_1$–$C_4$-alkylphenyl-substituted amino, hydroxyl or unsubstituted or phenyl-substituted $C_1$–$C_{10}$-alkylthio.

Suitable quinophthalone dyes, which are free of ionic groups, conform for example to the formula II (II)

where X is hydrogen, chlorine or bromine.

Any alkyl appearing in the abovementioned formula I may be straight-chain or branched.

In any substituted alkyl appearing in the abovementioned formula I the number of substituents is generally 1 or 2.

In any substituted phenyl appearing in the abovementioned formulae the number of substituents is generally from 1 to 3, preferably 1 or 2.

There follows an illustrative exemplification of radicals as defined in the formula I.

Alkyl is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, $5^{th}$ Edition, Vol. A 1, pages 290 to 293, and also Vol. A 10, pages 284 and 285).

Phenyl is for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl, 2-, 3- or 4-bromophenyl or 2-, 3- or 4-nitrophenyl.

Alkylthio and phenylthio are each for example methylthio, ethylthio, propylthio, isopropylthio, butylthio, isobutylthio, pentylthio, hexylthio, heptylthio, octylthio, isooctylthio, 2-ethylhexylthio, nonylthio, isononylthio, decylthio, isodecylthio, benzylthio or 1- or 2-phenylethylthio.

Alkoxy is for example methoxy, ethoxy, propoxy, isopropoxy, butoxy, isobutoxy, sec-butoxy, pentyloxy, isopentyloxy, neopentyloxy, tert-pentyloxy, hexyloxy, 2-methylpentyloxy, heptyloxy, octyloxy, isooctyloxy, 2-ethylhexyloxy, nonyloxy, isononyloxy, decyloxy, isodecyloxy, benzyloxy or 1- or 2-phenylethoxy.

Halogen is for example fluorine, chlorine or bromine.

Alkoxycarbonyl is for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl or hexyloxycarbonyl.

Alkanoyl is for example formyl, acetyl, propionyl, butyryl, pentanoyl or hexanoyl.

Sulfamoyl is for example methylsulfamoyl, ethylsulfamoyl, propylsulfamoyl, isopropylsulfamoyl, butylsulfamoyl, pentylsulfamoyl, hexylsulfamoyl, heptylsulfamoyl, octylsulfamoyl, 2-ethylsulfamoyl, 2-methoxyethylsulfamoyl, 2-ethoxyethylsulfamoyl, 3,6-dioxaheptylsulfamoyl, 3,6-dioxaoctylsulfamoyl, 4,8-dioxanonylsulfamoyl, 3,7-dioxaoctylsulfamoyl, 3,7-dioxanonylsulfamoyl, 4,7-dioxaoctylsulfamoyl, 4,7-dioxanonylsulfamoyl or 4,8-dioxadecylsulfamoyl.

Preference is given to dye preparations comprising one or more anthraquinone dyes of the formula I where $L^1$ is hydrogen, $C_1$-$C_4$-alkyl or unsubstituted or methyl-substituted phenyl and $L^4$ is hydroxyl, amino or unsubstituted or methyl-substituted phenylamino.

Preference is further given to dye preparations comprising one or more anthraquinone dyes of the formula I where $L^2$ is $C_1$–$C_4$-alkoxy, acetyl, $C_1$–$C_4$-alkoxycarbonyl or a radical of the formula

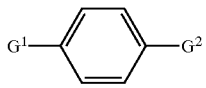

where $G^1$ and $G^2$ are each as defined above, with $G^1$ being in particular oxygen and $G^2$ in particular hydrogen.

Preference is further given to dye preparations comprising the quinophthalone dye of the formula IIa

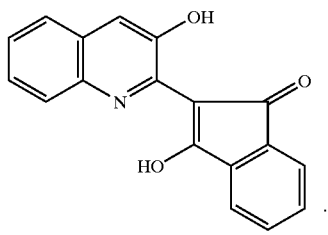

The dyes of the formulae I and II are generally known dyes. The anthraquinone dyes of the formula I are described for example in K. Venkataraman, The Chemistry of Synthetic Dyes, Vol. III, pages 391 to 413, Academic Press, New York, London, 1970. The quinophthalone dyes of the formula II are described for example in EP-A-83 553 or the literature cited therein.

Preference is given to dye preparations wherein 99% of the dye particles are smaller than 1 μm.

Preference is further given to dye preparations comprising dyes of the anthraquinone or quinophthalone series whose sublimation temperature is within the range from 140 to 300° C.

Preference is given to using a dispersant comprising an arylsulfonic acid-formaldehyde condensation product comprising from 3 to 50% by weight, based on the weight of the dispersant, of one or more aromatic or long-chain aliphatic carboxylic acids, their salts, their anhydrides or a mixture thereof.

The arylsulfonic acid-formaldehyde condensates used are in particular those having a maximum sulfonic acid group content of 40% by weight.

Suitable starting materials for the arylsulfonic acids include in particular a mixture of aromatic compounds obtainable by thermal cracking of a naphthenic residue oil and fractionation of the cracking products. Naphthenic residue oils are obtained for example in the cracking of light gasoline. In DE-A-2 947 005, for example, they are referred to as high boiling aromatic hydrocarbon oils. The naphthenic residue oil is preferably thermally cracked at from 1400 to 1700° C. The cracking products are then subjected to fractional distillation. The fraction passing over at atmospheric pressure (1013 mbar) at from 100 to 120° C. is collected and used as the aromatic compound for the sulfonation. Such a fraction is customarily obtained as a by-product in the known acetylene oil quench process (Ullmann's Encyclopedia of Industrial Chemistry, VCH Verlagsgesellschaft mbH, Weinheim, 1985, Volume A1, pages 107 to 112).

This aromatics fraction consists of a mixture of many aromatic substances whose structure and quantity can in practice not be determined in detail. The following aryl compounds are the chief representatives in this aromatics fraction:

|  | % by weight in aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction additionally includes, in terms of identified constituents, amounts from 0.1 to about 2% by weight of the following aryl compounds: fluorine, indane, methylstyrene, phenanthrene, methylindane, dimethylnaphthalene, ethylnaphthalene, xylenes, tetralin, styrene, methylethylbenzene, anthracene, fluoranthrene, pyrene, acenaphthylene and toluene.

Particularly suitable arylsulfonic acids generally comprise α- and β-naphthalenesulfonic acids in a ratio of the α- to the β-isomers of from 20:1 to 1:8, in particular from 10:1 to 1:5.

Suitable aromatic carboxylic acids or derivatives thereof include for example naphthalenecarboxylic acid, naphthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid or acid anhydrides, such as phthalic anhydride, trimellitic anhydride, benzene-1,2,4,5-tetracarboxylic dianhydride or naphthalic anhydride.

Suitable long-chain aliphatic carboxylic acids are in particular saturated or olefinically unsaturated, linear or branched aliphatic monocarboxylic acids having from 8 to 22, preferably from 8 to 18, carbon atoms of natural or synthetic origin, for example higher fatty acids such as caprylic acid, capric acid, lauric acid, myristic acid, palmitic acid, stearic acid, oleic acid, linoleic acid or linolenic acid, or synthetically produced carboxylic acids such as 2-ethylhexanoic acid, isononanoic acid or isotridecanoic acid.

Also of interest are mixtures of anhydrides, mixtures of carboxylic acids, mixtures of salts of the contemplated carboxylic acids and also mixtures of carboxylic acids and anhydrides. Suitable carboxylic acid salts include the alkali metal, ammonium or alkaline earth metal salts, for example those obtainable by neutralization of these carboxylic acids with sodium hydroxide, potassium hydroxide, lithium hydroxide, sodium carbonate, magnesium carbonate, calcium oxide, calcium hydroxide, ammonia or alkanolamines, such as ethanolamine, diethanolamine or triethanolamine.

Particular preference is given to using sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid in the dispersants.

The dye preparations of this invention preferably comprise dispersants comprising A) from 50 to 97% by weight, in particular from 70 to 95% by weight, of one or more arylsulfonic acid-formaldehyde condensates, and B) from 3 to 50% by weight, in particular from 5 to 30% by weight, of one or more aromatic or long-chain aliphatic carboxylic acids, their salts or their anhydrides or a mixture thereof.

The arylsulfonic acid-formaldehyde condensation products used according to this invention as dispersants are products known per se. They are described for example in U.S. Pat. No. 5,186,846.

The water-soluble dispersants based on alkoxylated phenols are preferably those of the formula III or IV

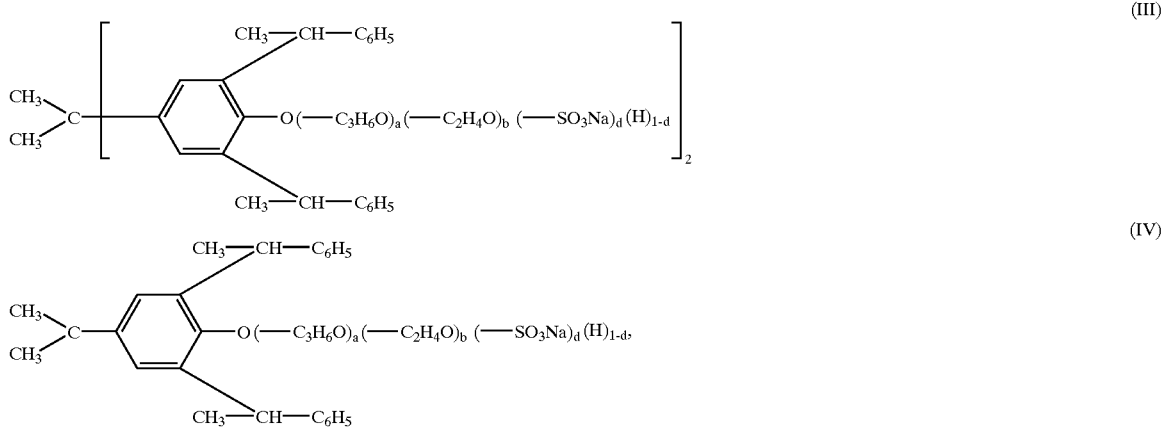

where
a is from 0 to on average 125,
b is on average from 37 to 250, the ratio b:a being at least 1:1 when b>37, and
d is 0 or 1, or mixtures thereof.

The products of the formulae III and IV can be obtained by reacting the phenol derivatives of the formula V or VI

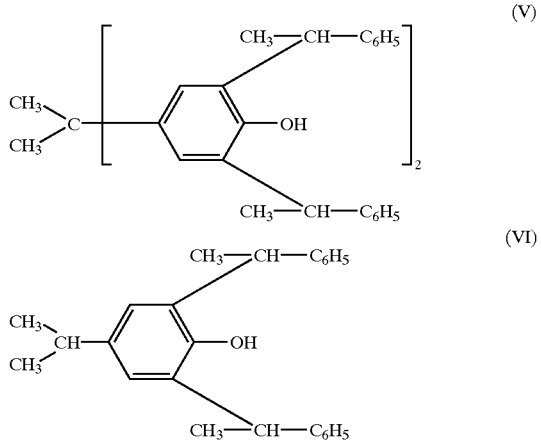

with propylene oxide and subsequent reaction of the adduct with ethylene oxide or by reacting V and/or VI with ethylene oxide. If desired, the adducts are reacted with chlorosulfonic acid or sulfur trioxide to convert them completely or partially into acid sulfuric esters and the resulting acid esters are neutralized with alkalis.

The phenols of the formulae V and VI are obtained by reacting phenol or 2,2-(p,p'-bishydroxydiphenyl)propane with 3 or 4 mol of styrene in the presence of an acid as catalyst. The phenols V and VI are reacted according to known processes first with ethylene oxide or only with ethylene oxide in the presence of acidic or alkaline catalysts to form the corresponding alkoxylation products III and IV where d=0. The alkoxylation can be carried out, for example, according to the processes described in U.S. Pat. No. 2,979,528. When b>37, it is mandatory that the ratio is $b/a > 1$.

The acid sulfuric esters are prepared by reaction of the alkoxylation products with chlorosulfonic acid or sulfur trioxide, the amount being selectable so that all the free hydroxyl groups are sulfated or only a portion thereof. The latter case produces mixtures of compounds of the formulae III and IV which contain free and sulfated hydroxyl groups. For use as dispersant, the as-synthesized acid esters of sulfuric acid are converted into water-soluble salts. Advantageous water-soluble salts are the alkali metal salts, for example the sodium or potassium salts. For this two equivalents of the basic compounds are required in the case of chlorosulfonic acid, one equivalent in the case of sulfur trioxide. The basic compound used is advantageously an aqueous alkali metal hydroxide. The neutralization temperature should not exceed 70° C. The salts obtained can be used in the form of aqueous solutions or else isolated as such and used in solid form.

Preference is given to dye preparations comprising dispersants where a is from 0 to on average 2.5, b is on average from 37 to 250 and d is from 0 to on average 0.5. Particular preference is given to preparations comprising dispersants where a is 0 to on average 2.5, b is on average from 50 to 100 and d is on average 0.5.

The abovementioned dispersants are known; cf. U.S. Pat. No. 4,218,218, for example.

Preference is given to dye preparations comprising, based on the weight of the preparation, from 1 to 15% by weight of one or more dyes selected from the class of the anthraquinones or quinophthalones and from 0.5 to 10% by weight of dispersant.

Preference is further given to dye preparations further comprising, based on the weight of the preparation, from 10 to 80% by weight, preferably from 10 to 70% by weight, of a mono- or polyhydric alcohol or mixtures thereof.

Suitable mono- or polyhydric alcohols are generally alkane monools or polyols, especially polyols, having from 2 to 8 carbon atoms, preferably from 2 to 6 carbon atoms, and up to 4, preferably from 2 to 4, alcoholic hydroxyl groups. Examples are 1,2-ethanediol, 1,2-propanediol, 1,3-propanediol, glycerol, 1,2,5-pentanetriol and 1,2,6-hexanetriol.

In addition, the dye preparations may comprise, based on the weight of the preparation, up to 10% by weight, preferably from 0.1 to 10% by weight, of a polyalkyleneglycol.

Suitable polyalkylene glycols for inclusion in the dye preparations of the invention are in particular polyethylene or polypropylene glycols having for example an average molecular weight from 100 to 1000, preferably from 100 to 600, especially about 400. If desired, ethylene oxide/propylene oxide copolymer can also be used.

Further possible ingredients for the dye preparations of this invention include for example assistants, such as preservatives, ntioxidants, foam inhibitors or viscosity regulators. These agents are known per se and are commercially available. If these agents are present in the dye preparations of this invention, their total amount is generally 1% by weight or less, based on the weight of the preparation.

Preferred dye preparations may further comprise surfactants for reducing the surface tension and for improving the wetting behavior in the ink head.

Preferred dye preparations comprise surfactants based on ethoxylated or propoxylated fatty or oxo alcohols, propylene oxide/ethylene oxide block copolymers, ethoxylates of oleic acid or alkylphenols, alkylphenol ether sulfates, alkylpolyglycosides, alkyl phosphonates, alkylphenyl phosphonates, alkylphenyl phosphates or alkynediols.

The percentages for the constituents of the dye preparations of the present invention add up to 100% by weight each time. If the sum of the constituents of the dye preparations of this invention adds up to a value which is less than 100% by weight, the remainder is generally water.

The dye preparations of this invention customarily have a viscosity of from 1 to 4 mm$^2$/sec, preferably from 2 to 3.5 mm$^2$/sec.

The surface tension of the dye preparations of this invention is generally within the range from 30 to 70 Nm/m, preferably within the range from 40 to 60 Nm/m.

The pH of the dye preparations of this invention is generally within the range from 5 to 11, preferably within the range from 7 to 10.

The novel dye preparations are prepared in a conventional manner. For instance, the dye, for example in the form of a press cake, can be mixed together with the dispersant, the mono- or polyhydric-alcohol and optionally polyalkylene glycol in the presence of water and predispersed in a suitable apparatus. The resulting mixture can then be treated in a mill to achieve the desired dye particle size. Finally, the final adjustment can be effected by adding appropriate amounts of water, optionally polyalkylene glycol and optionally further assistants and, after mixing, filtering by means of a sieve, preferably a sieve having a pore size of 1 μm.

The dye preparations of this invention are advantageously useful as inks in the inkjet process and also for sublimation transfer printing.

The inkjet printing process is usually carried out with aqueous inks, which are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted inkjet or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The dye preparations of this invention are particularly useful as inks for the bubble jet process or for the process employing a piezoelectric crystal.

Suitable substrates for the inkjet process include the below recited substrate materials as well as paper.

In sublimation transfer printing, a pattern is initially preformed on a transfer and then transferred by means of heat to a substrate. The dye can be fixed not only in the course of the transfer process itself but also in a subsequent fixation and aftertreatment operation. This process is common knowledge and described for example in Ullmann's Encyclopedia of Industrial Chemistry, 5th Edition, Volume A26, pages 499 to 501.

Suitable substrates include in particular textile materials, for example fibers, yarns, threads, knits, wovens or nonwovens composed of polyester, modified polyester, for example anionically modified polyester, blend fabrics of polyester with cellulose, cotton, viscose or wool, polyamide, polyacrylonitrile, triacetate, acetate, polycarbonate, polypropylene or polyvinyl chloride, polyester microfibers or else polymer-coated substrates, such as metal foils, glass or ceramic.

The dye preparations of this invention are particularly suitable for that form of sublimation transfer printing where the pattern on the transfer is produced by means of the inkjet process.

The novel dye preparations are notable for not causing inkjet nozzle blockages. Furthermore, their use leads to stripe-free prints.

The Examples which follow illustrate the invention.

The following dyes were used:

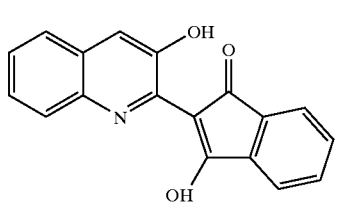

Dye 1

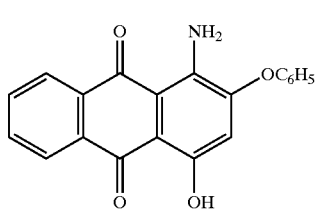

Dye 2

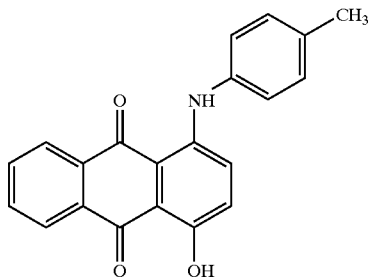

Dye 3

Dye 4

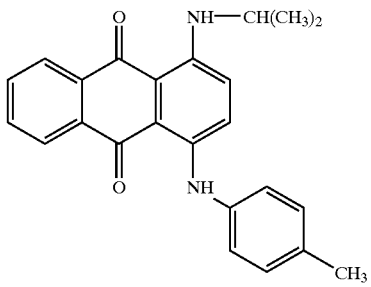

Making of Dye Preparation 15 g of dye, 15 g of polyethylene glycol (average molecular weight: 400), 7.5 g of a dispersant which is based on an arylsulfonic acid-formaldehyde condensation product, further comprises benzoic acid and is described as dispersant 3 in U.S. Pat. No. 5,186,846, 0.37 g of a 50% strength by weight aqueous solution of glutardialdehyde and 0.75 g of 47% strength by weight aqueous solution of tetramethylolacetylenediurea are made up with water to a total weight of 100 g and converted into a paste in a mill. Thereafter the pH is adjusted to 8.5 with 10% strength by weight sodium hydroxide solution.

The mixture is then milled in a stirred ball mill so that 99% of the dye particles have a size of less than 1 μm.

For final adjustment of preparations 1 to 4, 26.7 g of millbase are admixed with 72.5 g of 1,2-ethanediol (hereinafter: glycol), 0.1 g of 50% strength by weight aqueous solution of glutardialdehyde and 0.4 g of 47% strength by weight aqueous solution of tetramethylolacetylenediurea, mixed and filtered through a sieve having a pore size of 1 μm.

The following dye preparations were obtained (the percentages are by weight in each case):

TABLE 1

| | Preparation No. | | | |
|---|---|---|---|---|
| | 1 | 2 | 3 | 4 |
| Dye No. 1 (%) | 4 | | | |
| Dye No. 2 (%) | | 4 | | |
| Dye No. 3 (%) | | | 4 | |
| Dye No. 4 (%) | | | | 4 |
| Dispersant (%) | 2 | 2 | 2 | 2 |
| Glycol (%) | 72.5 | 72.5 | 72.5 | 72.5 |
| 50% strength by weight aqueous solution of glutardialdehyde (%) | 0.5 | 0.5 | 0.5 | 0.5 |
| 47% strength by weight aqueous solution of tetramethylolacetyleneurea (%) | 1.0 | 1.0 | 1.0 | 1.0 |
| Fully demineralized water (%) | 20 | 20 | 20 | 20 |

The dye preparations have the following physical and printing properties:

TABLE 2

| | Preparation No. | | | |
|---|---|---|---|---|
| | 1 | 2 | 3 | 4 |
| pH | 7.67 | 7.32 | 7.57 | 7.45 |
| Surface tension [mN/m] | 49.7 | 50.4 | 51.2 | 51.7 |

TABLE 2-continued

| | Preparation No. | | | |
|---|---|---|---|---|
| | 1 | 2 | 3 | 4 |
| Viscosity [mm$^2$/sec] | 11.75 | 10.9 | 19.1 | 10.54 |
| Particle size [μm] X$_{50}$ | 0.32 | 0.33 | 0.46 | 0.42 |
| Drop weight [ng] | 125 | 120 | 128 | 130 |

For final adjustment of preparations 5 to 8, 13.35 g of millbase are admixed with 36.25 g of glycol, 0.5 g of 50% strength by weight aqueous solution of glutardialdehyde, 0.2 g of 47% strength by weight aqueous solution of tetramethylolacetylene-diurea and 50 g of fully demineralized water, mixed and filtered through a sieve having a pore size of 1 μm.

The dye preparations obtained are recited below in Table 3 (the percentages are by weight in each case):

TABLE 3

| | Preparation No. | | | |
|---|---|---|---|---|
| | 5 | 6 | 7 | 8 |
| Dye No. 1 (%) | 2 | | | |
| Dye No. 2 (%) | | 2 | | |
| Dye No. 3 (%) | | | 2 | |
| Dye No. 4 (%) | | | | 2 |
| Dispersant (%) | 2 | 2 | 2 | 2 |
| Glycol (%) | 36.25 | 36.25 | 36.25 | 36.25 |
| 50% strength aqueous solution of glutardialdehyde (%) | 0.25 | 0.25 | 0.25 | 0.25 |
| 47% strength aqueous solution of tetramethyleneacetyleneurea (%) | 0.5 | 0.5 | 0.5 | 0.5 |
| Fully demineralized water (%) | 59 | 59 | 59 | 59 |

The dye preparations have the following physical and printing properties:

TABLE 4

| | Preparation No. | | | |
|---|---|---|---|---|
| | 5 | 6 | 7 | 8 |
| pH | 7.81 | 7.12 | 7.6 | 7.2 |
| Surface tension [mN/m] | 51.9 | 57 | 53.7 | 56.4 |
| Viscosity [mm$^2$/sec] | 2.69 | 2.61 | 4.51 | 2.72 |
| Particle size [μm] X$_{50}$ | 0.32 | 0.33 | 0.46 | 0.42 |
| Drop weight [ng] | 126 | 123 | 125 | 125 |

For final adjustment of preparations 9 to 12, 13.35 g of millbase are admixed with 36.25 g of glycol, 0.5 g of 50% strength by weight aqueous solution of glutardialdehyde, 0.2 g of 47% strength by weight aqueous solution of tetramethylolacetylene-diurea, 1 g of a commercial surfactant based on an alkyl phosphonate and 50 g of fully demineralized water mixed and filtered through a sieve having a pore size of 1 μm.

The dye preparations obtained are recited below in Table 5 (the percentages are by weight in each case):

TABLE 6

| | Preparation No. | | | |
|---|---|---|---|---|
| | 9 | 10 | 11 | 12 |
| Dye No. 1 (%) | 2 | | | |
| Dye No. 2 (%) | | 2 | | |

TABLE 6-continued

| | Preparation No. | | | |
|---|---|---|---|---|
| | 9 | 10 | 11 | 12 |
| Dye No. 3 (%) | | | 2 | |
| Dye No. 4 (%) | | | | 2 |
| Dispersant (%) | 2 | 2 | 2 | 2 |
| Glycol (%) | 36.25 | 36.25 | 36.25 | 36.25 |
| 50% strength aqueous solution of glutardialdehyde (%) | 0.25 | 0.25 | 0.25 | 0.25 |
| 47% strength aqueous solution of tetramethyleneacetyleneurea (%) | 0.5 | 0.5 | 0.5 | 0.5 |
| Surfactant (%) | 0.1 | 0.1 | 0.1 | 0.1 |
| Fully demineralized water (%) | 60.9 | 60.9 | 60.9 | 60.9 |

The dye preparations have the following physical and printing properties:

TABLE 6

| | Preparation No. | | | |
|---|---|---|---|---|
| | 9 | 10 | 11 | 12 |
| pH | 7.54 | 7.3 | 7.4 | 7.23 |
| Surface tension [mN/m] | 34.3 | 37.5 | 39 | 38.1 |
| Viscosity [mm$^2$/sec] | 2.81 | 2.5 | 6.08 | 2.68 |
| Particle size [µm] X$_{50}$ | 0.32 | 0.33 | 0.46 | 0.42 |
| Drop weight [ng] | 122 | 118 | 130 | 125 |

Test Methods and Evaluations

1) Surface Tension

The surface tension was measured with a Krüss K 10 digital tensiometer. The values reported in the tables are the averages of 3 measurements.

2) Viscosity

The viscosity was determined by the Ubbelohde method (DIN 51662).

3) pH

The pH was determined with a Knick 763 pH meter.

4) Particle Size Determination

The particle size distribution was measured with an Alcatel CILAS HR 850 granulometer.

5) Cogation Test

The behavior of the inks in the nozzles during the printing process is of particular importance. The following test examines the tendency of the inks to form deposits and blockages in the nozzles.

An Epson Stylus Color II (piezo printer from Seiko Epson) and also a Desk Jet Plus (bubble jet printer from Hewlett-Packard) were used as test equipment.

First, the average drop weight was determined as a function of the voltage applied to the nozzles. Then 1 million pulses were sent to each nozzle at constant voltage and thereafter the average drop weight of a defined number of drops was redetermined. This operation was repeated 10 times in total.

With an ideal ink, the average drop weight should remain constant over the test period.

The change in the drop weight of the individual inks is shown in the tables.

All the inks exhibit excellent flow characteristics in the above-indicated printers.

The initial writing characteristics of the inks were tested by the following method:

Two sheets of A4 paper were printed with a rectangular area measuring 18 cm×24 cm. Then the printer was left idle for 4 h. After this period, during which the surface of the ink in the jets may have dried, a further A4 sheet was printed as described above. The initial writing characteristics were judged by the start of the flow of the ink during printing. All preparations according to the invention have excellent initial writing characteristics. Following a 72 h idle period for the printing head in the standby position, none of the inks were found to give rise to failure of the jets in the first line of print.

Comparison:

Preparation #1 of prior application PCT/EP 97/02759 was tested in a Desk Jet Plus and also in an Epson Stylus Color II as described above. The Desk Jet Plus printer was found to give a perfect print in continuous printing, but on prolonged standby (less than 4 h) the jets became blocked after a short time, so that printing could only be continued after a thorough mechanical clean of the printing head.

In the Epson Stylus Color II, up to 10 of the 20 jets of the ink head failed during continuous printing. On prolonged idling without printing (printing head in the standby position), all the jets dried up within a short period. Renewed writing was only possible after thorough cleaning with suitable solvents. Mechanical cleaning was not enough.

We claim:

1. A method of printing, comprising:
   printing a substrate by the inkjet process employing an ink which is a dye preparation comprising, (i) based on the weight of the preparation, from 0.1 to 30% by weight of at least one dye selected from the group consisting of anthraquinones or quinophthalones which are free of ionic groups, and (ii) from 0.1 to 20% by weight of a dispersant which is an arylsulfonic acid-formaldehyde condensation product which is combined with 3 to 50% by weight, based on the weight of the dispersant, of at least one aromatic or long-chain aliphatic carboxylic acid, its salts, its anhydrides or mixtures thereof, or from 0.1 to 20% by weight of a water-soluble dispersant based on alkoxylated phenols, and (iii) from 10 to 90% by weight of a mono- or polyhydric alcohol or mixtures thereof and optionally water, with the proviso that the dye preparation whose liquid medium is exclusively water and polyalkylene glycol is excluded if the dye preparation is formulated with a dispersant which is an arylsulfonic acid-formaldehyde condensation product.

2. The method according to claim 1, which comprises, based on the weight of the preparation, of 1 to 15% by weight of at least one dye selected from the group consisting of anthraquinone or quinophthalone and from 0.5 to 10% by weight of dispersant.

3. The method according to claim 1, wherein the mono- or polyhydric alcohol is an alkane monool or polyol having from 2 to 8 carbon atoms and up to 4 alcoholic hydroxyl groups.

4. The method according to claim 1, wherein the dye preparation contains particles of dye, 99% of which are of a size smaller than 1 µm.

5. A method of printing, comprising:
   printing a substrate by the sublimation transfer process employing an ink which is a dye preparation comprising, (i) based on the weight of the preparation, from 0.1 to 30% by weight of at least one dye selected from the group consisting of anthraquinones or quinophthalones which are free of ionic groups, and (ii) from 0.1 to 20% by weight of a dispersant which is an arylsulfonic acid-formaldehyde condensation product which is combined with 3 to 50% by weight, based on the weight of the dispersant, of at least one aromatic or long-chain aliphatic carboxylic acid, its salts, its anhydrides or mixtures thereof, or from 0.1 to 20% by weight of a water-soluble dispersant based on alkoxylated phenols, and (iii) from 10 to 90% by weight of a mono- or polyhydric alcohol or mixtures thereof and optionally water, with the proviso that the dye preparation whose liquid medium is exclusively water and polyalkylene glycol is excluded if the dye preparation is formulated with a dispersant which is an arylsulfonic acid-formaldehyde condensation product.

6. The method according to claim 5, which comprises, based on the weight of the preparation, of 1 to 15% by weight of at least one dye selected from the group consisting of anthraquinone or quinophthalone and from 0.5 to 10% by weight of dispersant.

7. The method according to claim 5, wherein the mono- or polyhydric alcohol is an alkane monool or polyol having from 2 to 8 carbon atoms and up to 4 alcoholic hydroxyl groups.

8. The method according to claim 5, wherein the dye preparation contains particles of dye, 99% of which are of a size smaller than 1 $\mu$m.

* * * * *